US012711367B2

(12) United States Patent
Peng et al.

(10) Patent No.: US 12,711,367 B2
(45) Date of Patent: Aug. 18, 2026

(54) MICRORING RESONATOR-BASED OPTICAL DEVICE WITH IMPROVED LINEARITY

(71) Applicant: Hewlett Packard Enterprise Development LP, Spring, TX (US)

(72) Inventors: Yiwei Peng, Milpitas, CA (US); Yuan Yuan, Milpitas, CA (US); Stanley Cheung, Milpitas, CA (US); Wayne Victor Sorin, Mountain View, CA (US); Marco Fiorentino, Mountain View, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 790 days.

(21) Appl. No.: 18/178,094

(22) Filed: Mar. 3, 2023

(65) Prior Publication Data

US 2024/0296320 A1 Sep. 5, 2024

(51) Int. Cl.

| | |
|---|---|
| ***G02B 6/293*** | (2006.01) |
| ***G02F 1/21*** | (2006.01) |
| ***G02F 1/225*** | (2006.01) |
| ***G06N 3/067*** | (2006.01) |

(52) U.S. Cl.

CPC ......... *G06N 3/067* (2013.01); *G02B 6/29341* (2013.01); *G02B 6/29343* (2013.01); *G02B 6/29355* (2013.01); *G02F 1/212* (2021.01); *G02F 1/225* (2013.01)

(58) Field of Classification Search

CPC ............ G02B 6/29341; G02B 6/29343; G02B 6/29355; G02F 1/212; G02F 1/255; G06N 3/067

See application file for complete search history.

(56) References Cited

U.S. PATENT DOCUMENTS 6,411,756 B2 * 6/2002 Sadot ...................... G02F 1/225 385/32
7,149,381 B2 * 12/2006 Margalit ................ H01S 5/141 385/39
7,421,168 B1 * 9/2008 Goutzoulis .......... H04B 10/675 359/337.2

(Continued)

OTHER PUBLICATIONS

Cheung et al., "Demonstration of a 17×25 Gb/s Heterogeneous III-V/Si DWDM Transmitter Based on (De-) Interleaved Quantum Dot Optical Frequency Combs", Journal of Lightwave Technology, vol. 40, No. 19, Oct. 1, 2022, 9 pages.

(Continued)

*Primary Examiner* — Ryan A Lepisto

(74) *Attorney, Agent, or Firm* — Hewlett Packard Enterprise Patent Department

(57) ABSTRACT

An example microring resonator (MRR) based optical device having improved linearity is presented. The optical device includes a first MRR and a first bus waveguide optically coupled to the first MRR. Further, the optical device includes a second MRR optically coupled to the first MRR, and a second bus waveguide optically coupled to the second MRR. The first MRR and the second MRR are formed between the first bus waveguide and the second bus waveguide. The optical coupling between the first MRR and the second MRR increases the linearity in the optical output of the optical device.

15 Claims, 9 Drawing Sheets

(56) References Cited

U.S. PATENT DOCUMENTS

| | | | | |
|---|---|---|---|---|
| 7,941,014 | B1 * | 5/2011 | Watts | G02B 6/1223<br>385/32 |
| 8,095,010 | B2 * | 1/2012 | Socci | G02B 6/29395<br>398/85 |
| 8,467,122 | B2 * | 6/2013 | Zheng | H01S 5/142<br>359/344 |
| 8,494,318 | B2 * | 7/2013 | Bolla | G02B 6/29395<br>385/32 |
| 8,606,055 | B2 * | 12/2013 | Lipson | G02F 1/025<br>385/39 |
| 9,806,820 | B2 * | 10/2017 | Wang | H04B 10/564 |
| 9,829,767 | B2 * | 11/2017 | Ma | G02F 1/3133 |
| 9,832,552 | B2 * | 11/2017 | Lee | H04J 14/06 |
| 10,447,409 | B2 * | 10/2019 | Goutzoulis | H04B 10/90 |
| 10,714,895 | B2 * | 7/2020 | Krishnamoorthy | G02F 1/2257 |
| 10,801,891 | B2 * | 10/2020 | Komljenovic | G01J 3/1895 |
| 10,811,848 | B2 * | 10/2020 | Zilkie | H01S 5/4087 |
| 11,002,912 | B2 * | 5/2021 | Matres | G02B 6/29341 |
| 11,101,620 | B2 | 8/2021 | Cohen et al. | |
| 11,105,980 | B1 * | 8/2021 | Hu | H04J 14/0209 |
| 11,125,946 | B2 * | 9/2021 | Le Maitre | G02F 1/3132 |
| 11,320,677 | B2 * | 5/2022 | Zhou | G02F 1/0121 |
| 11,719,963 | B2 * | 8/2023 | Lu | G02F 1/225<br>385/3 |
| 11,874,501 | B1 * | 1/2024 | Nichols | G06E 3/001 |
| 12,025,862 | B2 * | 7/2024 | Shen | H04B 10/541 |
| 12,032,210 | B2 * | 7/2024 | Nahmias | H04J 14/02 |
| 12,222,628 | B2 * | 2/2025 | Xu | G02F 1/3509 |
| 12,372,718 | B2 * | 7/2025 | Dede | G02B 6/29343 |
| 2006/0159392 | A1 * | 7/2006 | Popovic | G02B 6/29383<br>385/27 |
| 2009/0220228 | A1 * | 9/2009 | Popovic | H04J 14/0204<br>398/48 |
| 2019/0370652 | A1 * | 12/2019 | Shen | G06N 3/0475 |
| 2020/0019851 | A1 | 1/2020 | Mehrabian et al. | |
| 2020/0280173 | A1 * | 9/2020 | Gao | H01S 5/02415 |
| 2021/0264241 | A1 * | 8/2021 | Karanth | G06F 7/5443 |
| 2021/0405308 | A1 * | 12/2021 | Bhargava | G02B 6/2773 |
| 2024/0378432 | A1 * | 11/2024 | Wang | G06N 3/044 |
| 2025/0021809 | A1 * | 1/2025 | Peng | G06N 3/0675 |

OTHER PUBLICATIONS

Cohen, R., et al.; "Linearized electro-optic racetrack modulator based on double injection method in silicon"; Jan. 28, 2015; 10 pages.

Cohen, R., et al.; "Response Shaping with a Silicon Ring Resonator"; Oct. 26, 2018; 15 pages.

Guo et al., "Multi-Level Encoding and Decoding in a Scalable Photonic Tensor Processor With a Photonic General Matrix Multiply (GeMM) Compiler", IEEE, 2022, 14 pages.

Jiang et al., "Physical Limitation Aware Quantization Model for Photonic Convolutional Neural Network", Asia Communications and Photonics Conference (ACP), 2021, 3 pages.

Shastri et al., "Photonics for artificial intelligence and neuromorphic computing", 2021, 21 pages.

Shastri et al., "Silicon Photonic Neural Applications and Prospects", SPIE OPTO, 2022, 11 pages.

Shen et al., "Deep Learning with Coherent Nanophotonic Circuits", 2016, 8 pages.

Zhang et al., "Silicon microring synapses enable photonic deep learning beyond 9-bit precision", Apr. 19, 2022 , 7 pages.

Zheng, P., et al.; "Integrated Multi-Functional Optical Filter Based on a Self-Coupled Microring Resonator Assisted MZI Structure"; Mar. 1, 2021; 9 pages.

* cited by examiner 200
202
204
206
128
129
132
134
102
104
106
108
110
112
114

400B

404

1

0.95

0.9

0.8

0.7

0.6

0.5

0.4

0.3

0.2

0.1

0

TRANSMISSION

401

403

-1.5Π

-Π

-0.5Π

0

0.5Π

Π

1.5Π

PHASE ANGLE (Θ)

402

MICRORING RESONATOR-BASED OPTICAL DEVICE WITH IMPROVED LINEARITY

BACKGROUND

Optical devices such as a microring resonator (MRR) and a Mach-Zehnder interferometer (MZI) are widely used as basic building blocks for optical neural networks. An optical neural network may include several neural network cells including such optical devices arranged in a matrix configuration. The optical neural networks often require these cells to be tuned frequently during the training process of the optical neural networks by setting weights for respective MRRs or MZIs. Generally, these optical devices exhibit a sinusoidal transmission function which may not be ideal for matrix weighing requiring complex circuitry and training logic.

BRIEF DESCRIPTION OF THE DRAWINGS

Various examples will be described below with references to the following figures.

Figure 1:
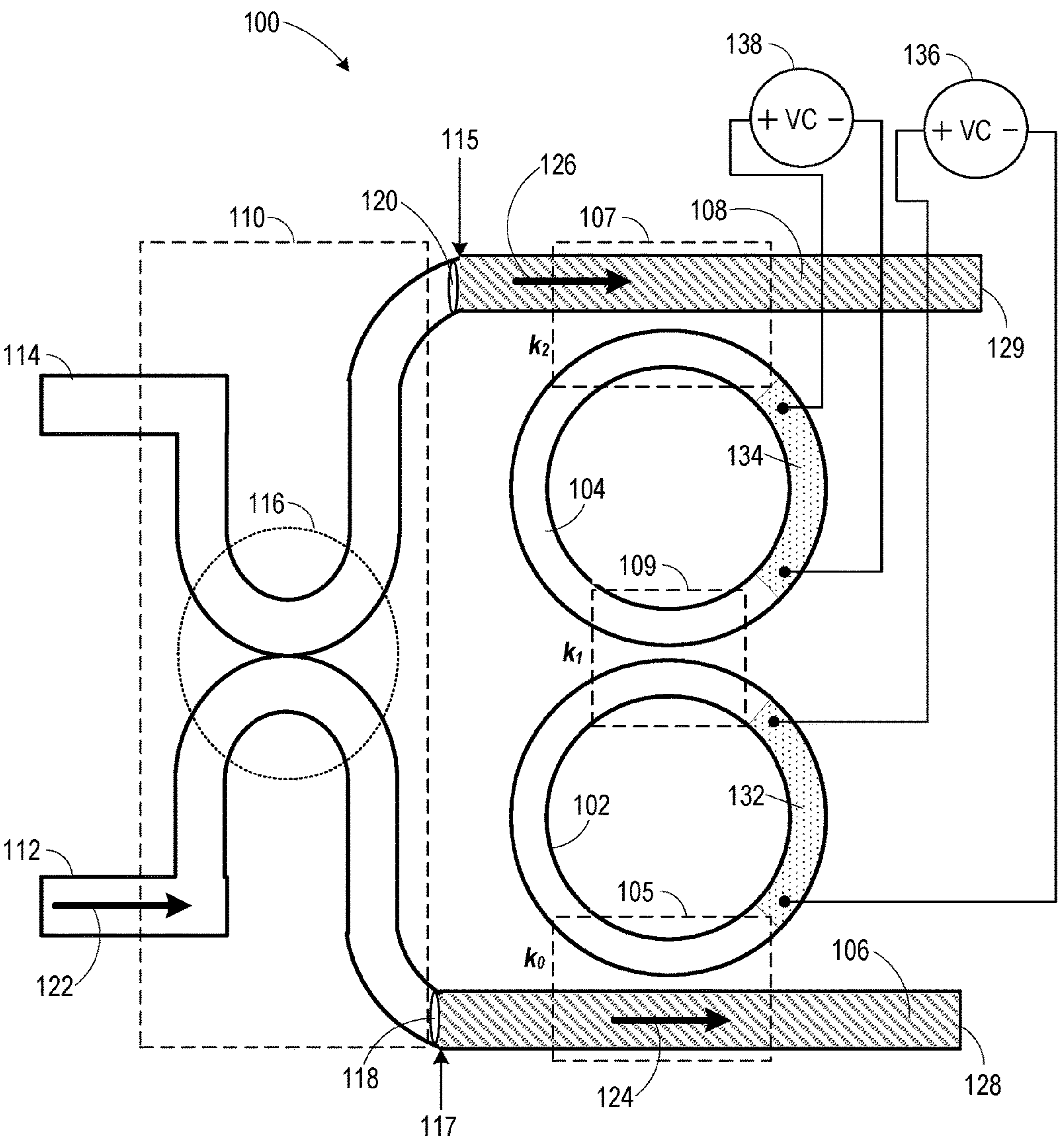
FIG. 1 depicts an example optical device with dual coupled microring resonators to improve linearity in optical output.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, the same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Optical systems include optical devices that can generate, process, and/or carry optical signals from one point to another point. Neuromorphic computing has shown significantly superior performance compared with traditional central processing units (CPUs) for specific neural network tasks. Artificial neural networks implementing neuromorphic computing have proven remarkable capabilities in various tasks, including computer vision, speech recognition, machine translations, medical diagnoses, and gaming. A majority of the electrical artificial neural network hardware's energy consumption comes from data movement in the synaptic interconnections, for example, data movements between memory devices and processors.

Optical neural networks (ONNs), also known as photonic neural networks, are expected to improve energy efficiency and throughput significantly in comparison to electrical artificial neural networks due to their capabilities of transmitting data at the speed of light without having a length-dependent impedance. Optical neural network (ONN) implementations are mainly divided into two broad categories. The first one is called broadcast-and-weights ONN, which uses MRR filters implementing wavelength-division multiplexing (WDM) to achieve large-scale interconnects and massively parallel data processing. The resonant nature of the MRRs used in the WDM-based system would result in inter-channel cross-talk and Lorentzian-shaped output. As it is apparent, the Lorentzian-shaped output would lead to a limited linear region. A second category of ONNs is a coherent ONN approach that performs matrix multiplication within a single wavelength by controlling destructive or constructive interference effects in MZI meshes. The MZIs have a much larger footprint than MRRs, limiting the network density and power consumption in weight configuration.

For ONN implementations, higher weighting precision is useful to account for noisy input signals. The photonic systems nowadays are limited to low precision due to the inherent Lorentzian-shaped and sinusoidal transfer functions of conventional MRRs and MZIs. To achieve high-bit precision operation, optical devices such as the MRRs and MZIs, in the ONN implementations are often tuned several times (e.g., several hundreds of times) during the training process of the ONN. This tuning entails encoding the output of these optical devices. The traditional MZIs have sinusoidal transfer functions, and the traditional MRRs have Lorentzian-shaped transfer functions. As it is apparent, the encoding of the sinusoidal or the Lorentzian-shaped output requires additional electronic control circuits such as a digital-to-analog converter to compensate for the nonlinearity of the sinusoidal output. In particular, in some implementations, a feedback circuit or a pre-calibrated look-up table may be used for each MZI and MRR in the ONN to aid in such encoding, which will significantly increase the system complexity, latency, and energy cost. Moreover, since electronic control circuits do not have extremely high precision, the outputs of the traditional MZIs and MRRs may end up limiting the bit precision of each cell of the ONN and further restricting the training correctness of the entire ONN. Therefore, the sinusoidal transmission via the traditional MZIs and the Lorentzian-shaped transmission via the traditional MRRs may not be ideal for matrix weighing of the ONN as it requires complex circuitry and training logic.

An existing solution attempted to minimize the nonlinearity in the output of an MRR to a certain extent. In particular, the existing solution implemented a double injection resonator with asymmetric waveguide arms to achieve a linearized triangular shape. In particular, the existing solution implemented an additional waveguide arm formed adjacent to an MRR in addition to a typical bus waveguide arm used to feed light into the MRR. The additional waveguide arm of the existing solution has a curved and open-ended structure whereas the bus waveguide has a straight profile. The existing solution entails injecting two mutually coherent light signals (e.g., one via the bus waveguide and another via the additional waveguide) at the same wavelength into the MRR resonator in opposite directions. These coherent light signals interfere with each other inside the MRR and increase the diversity of independent parameters, which may in turn generate several transmission functions that may cancel certain non-linearities in the optical output of the MRR.

As noted earlier, the prior structure has asymmetric waveguide arms. The use of asymmetric waveguide arms makes it difficult to match the phase of two waveguide arms. In some instances, additional heaters may be required to achieve a useful phase difference between the two waveguide arms. As it is known, heaters generally require additional power. Moreover, generally, two complementary output signals are useful in ONN implementations. The complex routing of the asymmetric waveguide arms in the existing solution makes it hard to connect both output ports with other units and achieve a large-scale massive integration. As will be understood, additional crossing and routing of optical waveguides may not only make the neural network implementations complex but also induces phase variations in the optical signals.

In accordance with the examples presented herein, an enhanced optical device is presented that may overcome one or more of the challenges described hereinabove. In particular, the proposed optical device includes coupled MRRs to achieve the optical output with increased linearity thereby allowing precise control of weights when implemented in optical neural networks.

In particular, the example optical device may include a plurality of MRRs, for example, a first MRR and a second MRR optically coupled to each other. Further, the second MRR is optically coupled to a second bus waveguide. In particular, the first MRR and the second MRR are formed between the first bus waveguide and the second bus waveguide. The optical coupling between the first MRR and the second MRR causes additional injection of light into the first MRR which reduces non-linearity in the optical output of the optical device. In accordance with the examples presented herein, the second MRR is over-coupled with the second bus waveguide causing the second MRR to exhibit superlinear variation in the phase of the optical signal propagating in the second MRR. In particular, the first MRR and the second MRR are designed such that the superlinear transmission characteristic of the second MRR is aligned with the center of the optical output signal of the optical device thereby improving the linearity of the first optical output signal and the second optical output signal. Moreover, in some examples, the output ports of the optical device are formed on the same side of the first MRR and the second MRR which reduces routing complexities in optical systems that use the optical device.

As will be appreciated, the proposed optical device with coupled MRRs exhibits increased linearity compared to the response of the conventional MRRs. Linear regression residuals for the proposed optical devices show that the proposed structure improves a bit precision of the optical device by two bits compared to normal MZIs and three bits compared to normal MRRs, respectively. Further, the proposed optical device may be used both in coherent and WDM-based neuromorphic networks. The compact coupled MRRs have a small footprint and offer increased information density. In addition, the feedforward path as realized by forming the output ports on one side of the MRRs makes the proposed optical device connect with other units easily with the simple routing of bus waveguides. Moreover, the proposed optical device structure has shorter waveguide lengths, which decreases the optical power loss.

Additionally, compared to conventional MZIs, the proposed optical device structure has smaller capacitance, and thus the switching and training speeds of the proposed optical device are higher compared to the conventional MZIs. In addition, due to the smaller capacitance, the power consumption of the proposed optical device is lower. Further, the higher bit precision achieved by the proposed optical device may remove the need for the electronic control circuit, increase system energy efficiency, and lower system latency. Furthermore, the proposed optical device may not require complex implementations such as the use of a lookup table thereby making the training of the ONNs faster and easier. Moreover, the proposed optical device is capable of being fabricated via standard photonics foundries because of their overall simple designs, and hence, have the potential to be low-cost and CMOS compatible.

Referring now to the drawings, in FIG. 1, an example optical device 100 is presented. The optical device 100 may find applications in optical neural networks capable of storing and processing data in optical form, or in any optical communication system. One or more such optical devices may be implemented in optical neural networks (see FIGS. 2 and 6) and in the form of a photonic integrated circuit (see FIG. 9). In one example, such a photonic integrated circuit may be implemented in computers (stationary or portable), servers, storage systems, wireless access points, network switches, routers, docking stations, printers, or scanners. The optical device 100 of FIG. 1 may include a plurality of microring resonators (MRRs), for example, a first MRR 102 and a second MRR 104 (hereinafter collectively referred to as MRRs 102, 104) optically coupled to each other to enhance the linearity in the optical outputs of the optical device 100. Further, the optical device 100 includes bus waveguides such as a first bus waveguide 106 and a second bus waveguide 108; and an optical distributor 110 to supply optical signals to the MRRs 102, 104. Each of the MRRs 102, 104, bus waveguides 106, 108 and the optical distributor 110 includes a waveguide to allow propagation of the optical signals (e.g., light) therethrough during the operation of the optical device 100.

The first bus waveguide 106 and the second bus waveguide 108 are connected to each other at respective first ends 115 and 117 via the optical distributor 110. The optical distributor 110 may be any optical device capable of receiving an input optical signal (hereinafter referred to as an input light stream) and supplying at least a portion of the input light stream to the first bus waveguide 106 and the second bus waveguide 108. Examples of the devices that may be used as the optical distributor 110 may include an optical coupler, an optical splitter, or a Multimode Interference (MMI) coupler. For illustration purposes, in FIG. 1, the optical distributor 110 is implemented and described as an optical coupler. The optical distributor 110 includes coupler input ports 112, 114; a coupling section 116; and coupler output ports 118, 120. In particular, the bus waveguides 106, 108 are coupled to the optical distributor 110 at the coupler output ports 118, 120, respectively. The optical distributor 110 may be connected to a light source (e.g., a laser or any other device supplying light to the optical distributor 110) to receive an input light stream 122 at any of the coupler input ports 112 or 114. For illustration hereinafter, an input light/optical signal may be considered as applied to the coupler input port 112. The optical distributor 110 generates a first light stream 124 and a second light stream 126 from the input light stream via an optical coupling at the coupling section 116. In particular, via the coupling section 116, the input light stream 122 may be divided into the first light stream 124 and the second light stream 126. The optical distributor 110 feeds the first light stream 124 and the second light stream 126 to the first bus waveguide 106 and the second bus waveguide 108, respectively.

Further, the optical output of the optical device 100 may be obtained at any of the output ports, such as a through port 128 and an add port 129, hereinafter collectively referred to as device output ports 128, 129. For the purpose of illustration hereinafter, the optical output is collected/measured at the device output port 128. As depicted in FIG. 1, the optical device 100 has the device output ports 128, 129 formed on the same side of the MRRs 102, 104, resulting in reduced routing complexities in optical systems that use the optical device 100 (see example couplings in FIGS. 2 and 6).

Furthermore, for illustration purposes, in FIG. 1, the MRRs 102 and 104 are shown to have ring shapes. However, in some other examples, the MRRs 102 and 104 may also be formed to have a loop of any shape (e.g., circular loop, oval loop, rounded rectangle loop, rounded square loop, rounded triangle loop, etc.), within the purview of the present disclosure. In some examples, an MRR having a loop shape that is elongated to have a straight section along one direction (e.g., racetrack-shaped or elongated oval-shaped) is also envisioned within the purview of the present disclosure. In some examples, each of the MRRs 102 and 104 may be created by forming an annular waveguide, hereinafter referred to as an MRR cavity, in a device layer (e.g., made of Silicon) of a semiconductor substrate (e.g., a silicon on insulator substrate. In particular, in some examples, an oxide layer may be formed on top of the MRR cavity. Further, a buffer layer (e.g., made of III-V material) may be formed on top of the oxide layer using techniques such as, but not limited to, deposition, wafer bonding, monolithic growth, or other fabrication techniques. Examples of the III-V materials that may be used to form the buffer layer may include, GaAs, Gallium nitride (GaN), Indium nitride (InN), or combinations thereof.

In the optical device 100, the first MRR 102 may be formed adjacent to the first bus waveguide 106 causing an optical coupling between the first MRR and the first bus waveguide. The term "optically coupled" or "optical coupling" as used herein may refer to the relative positioning of two optical components (e.g., the first MRR 102 and the first bus waveguide 106, in this case) that allow evanescent coupling of light between the two optical components. In particular, a region 105 marked with a dashed box represents a coupler section, hereinafter referred to as bus-ring coupler 105, which enables evanescent coupling of light between the first bus waveguide 106 and the first MRR 102. In some examples, the first MRR 102 is formed such that a coupling coefficient ($k_0$) of the bus-ring coupler 105 between the first MRR 102 and the first bus waveguide 106 is smaller than the optical losses incurred inside the first MRR 102. With such a positioning of the first MRR 102 and the first bus waveguide 106, the first MRR 102 is said to be under-coupled with the first bus waveguide 106.

As depicted in FIG. 1, the first MRR 102 and the second MRR 104 are formed between the first bus waveguide 106 and the second bus waveguide 108. In particular, the first MRR 102 is formed between the first bus waveguide 106 and the second MRR 104, and the second MRR 104 is formed between the first MRR 102 and the second bus waveguide 108. The second MRR 104 is optically coupled to the second bus waveguide 108 along a region 107 (marked with a dashed box), hereinafter referred to as bus-ring coupler 107 causing evanescent coupling of light between the second bus waveguide 108 and the second MRR 104. The second MRR 104 is over-coupled to the second bus waveguide 108. In particular, two optical components (e.g., a bus waveguide and an MRR) are said to be "over-coupled" when a coefficient of coupling between the two optical components is greater than the optical losses (e.g., optical losses incurred inside the MRR and power coupling out of the MRR). In the example implementation of FIG. 1, the second MRR 104 is formed such that a coupling coefficient ($k_2$) of the bus-ring coupler 107 between the second MRR 104 and the second bus waveguide 108 is greater than the optical losses incurred inside the second MRR 104 and any optical power coupling out of the second MRR 104.

Further, the second MRR 104 is also optically coupled to the first MRR 102 along a region 109 (marked with a dashed box), hereinafter referred to as ring-ring coupler 109 causing evanescent coupling of light between the first MRR 102 and the second MRR 104.

In FIG. 1, symbols $k_0$, $k_1$, $k_2$ respectively represent the coupling coefficients of the bus-ring coupler 105, the ring-ring coupler 109, and the bus-ring coupler 107. The over-coupled second MRR 104 exhibits superlinear characteristics in phase angles over a range of wavelengths near its resonant wavelength (i.e., for a range of wavelengths near the resonant wavelength of the second MRR 104). A range of wavelengths for which the second MRR exhibits a superlinear change transmission over phase variations is hereinafter referred to as a superlinear transmission region of the second MRR 104.

During the operation of the optical device 100, when an optical signal (e.g., the input light stream 122) is supplied to the coupler input port 112, a portion of the first light stream 124 may couple into the first MRR 102 and a portion of the second light stream 126 may couple into to the second MRR 104. The remaining portions of the light streams that are not coupled into the MRRs 102, 104 may exit the optical device 100 via the respective device output ports 128, 129 as output optical signals. The MRRs 102, 104 may be operated in a resonance state, off-resonance state, or any state between the resonance state and the off-resonance state depending on the wavelength and the phase of the optical signal. In particular, for an MRR, the resonance state is an operating state of the MRR when a particular wavelength resonates within the MRR and causes optical confinement in the MRR. Whereas the off-resonance state is an operating state of the MRR when the light does not resonate inside the MRR causing no optical confinement inside the MRR compared to the on-resonance state.

The optical coupling between the first MRR 102 and the second MRR 104 increases the linearity in the optical output of the optical device 100. In the examples presented herein, because the second MRR 104 is over-coupled to the second bus waveguide 108, the second MRR 104 exhibits a superlinear change in phase angles over a range of wavelengths near the resonant wavelength of the second MRR 104. The example optical device 100 of the present disclosure utilizes such superlinear transmission characteristics of the second MRR 104 to compensate for nonlinearities in the optical output at the device output ports 128 and 129.

To cause the superlinear transmission characteristics of the second MRR 104 to compensate for the nonlinearities in the optical output, the superlinear transmission region of the second MRR 104 is aligned at the resonance of the first MRR 102. In other words, the superlinear transmission region of the second MRR 104 may be aligned at the center of the optical output of the optical device 100. The center of the optical output or transmission (Typically, marked as “0” location along an x-axis in transmission characteristics, see FIGS. 2A, 2B, 7A, 7B, for example) represents a resonance in the first MRR 102. Such an alignment of the superlinear transmission region is achieved by designing the MRRs 102 and 104 to have the same resonant wavelengths and causing optical signals to propagate at the same phase angles in the MRRs 102 and 104. In particular, the MRRs 102 and 104 may be designed to have similar construction, for example, with similar dimensions/size, so that the resonant wavelengths of the MRRs 102 and 104 match with each other. In one example, the MRRs 102 and 104 may be designed to have the same diameters, thicknesses, and widths so that both the MRRs 102 and 104 have the same resonant wavelengths. Further, to compensate for manufacturing deviations and to align phase angles of the propagating optical signals, the MRRs 102 and 104 may include phase shifters 132 and 134, respectively.

In the description hereinafter, the phase shifters 132 and 134 are described as being metal plates formed over the MRRs 102 and 104, respectively. In some other examples, the phase shifters 132 and 134 may as well be MEMSs, MOS-capacitors, P-I-N junctions, P-N junctions, or combinations thereof. In particular, the phase shifter 132 may be formed along a portion of the first MRR 102 to adjust a phase of the optical signal inside the first MRR 102 based on the voltage applied to the phase shifter 132 via an external power source 136. Furthermore, the phase shifter 132 may be formed along a portion of the second MRR 104 and is connected to another external power source 138 to receive power to induce a phase change in the optical signal inside the second MRR 104.

In the case of the phase shifters 132 and 134 being metal heaters, the voltage applied via the external power sources 136, 138 causes the phase shifters 132 and 134 to generate heat which changes material properties locally inside the first bus waveguide 106. Such change in the material property causes a change in the refractive index of the MRRs 102, 104 which in turn results in a change in the phase of the optical signals propagating inside the MRRs 102, 104. Such phase variations caused via the phase shifters 132 and 134 are referred to as ring-induced phase changes. The ring-induced phase changes may be adjusted to finetune the alignment of the phase angles of the optical signals propagating inside the MRRs 102 and 104 so that the superlinear transmission region of the MRR 104 aligns with the peaks of the optical output (at ports 128, 129) of the optical device 100. This results in an improvement in the linearity of the first optical output signal and the second optical output signal. In some examples, voltages applied via both the external power sources 136 and 138 may be simultaneously varied to match their resonant wavelengths and to match the phase angles of the optical signals propagating therein.

As will be appreciated, the proposed optical device, for example, the optical device 100, exhibits linear characteristics in the respective optical output resulting in a one-to three-bit improvement in the bit precision of the optical device 100 compared to the conventional MRR. Further, as will be appreciated, the higher bit precision offered by the optical device simplifies the electronic control circuits, increases system energy efficiency, and improves the training correctness of the optical neural networks. Furthermore, the proposed optical device 100 may entail the use of one or two phase shifters (e.g., the phase shifters 132, and 134) to control the phase of the optical signals inside the optical device 100, which does not add much complexity compared to the conventional MZI. Accordingly, the proposed optical device 100 may be more suitable for large-scale integration. Further, the proposed optical device 100 is capable of fabricating via standard photonics foundries because of their overall simple designs, and hence, have the potential to be low-cost and CMOS compatible.

Figure 2:
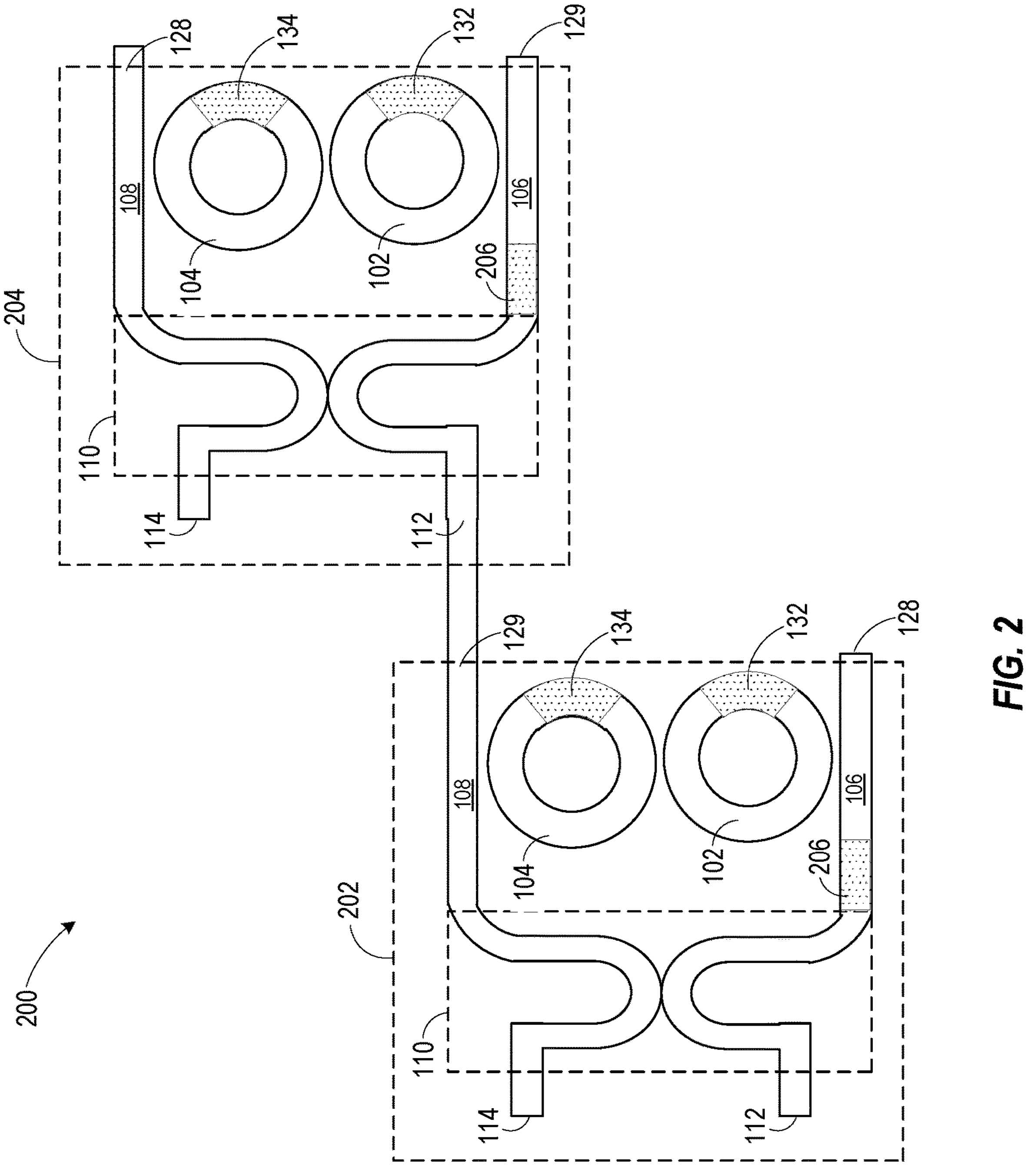
FIG. 2 depicts a block diagram of an example coherent optical neural network implemented using an example optical device.

Referring now to FIG. 2, a block diagram of an example coherent optical neural network 200 is depicted. The coherent optical neural network 200 may find applications in optical neural network systems capable of storing and processing data in optical form, or in any optical communication system. The coherent optical neural network 200 of FIG. 2 is implemented using a plurality of optical devices, for example, optical devices 202 and 204. Although the coherent optical neural network 200 of FIG. 2 is shown to include two optical devices 202 and 204, the coherent optical neural network 200 is envisioned to include several such additional optical devices, without limiting the scope of the present disclosure. The optical devices 202 and 204 are example representatives of the optical device 100 of FIG. 1 and include one or more components and connections as described in conjunction with FIG. 1, details of which are not repeated herein for the sake of brevity. Accordingly, for illustration, each of the optical devices 202 and 204 is shown to have similar internal construction as that of the optical device 100 except for an additional phase shifter 206, and the same reference numerals as depicted in FIG. 1 are used in FIG. 2.

In the coherent optical neural network 200, the optical devices 202 and 204 are connected such that the coupler input port 112 of the optical device 204 is connected to the add port 129 of the optical device 202 to receive the optical output signal of the optical device 202 as an input optical signal. Although not shown in FIG. 2, each of the phase shifters 206, 132, and 134 in the optical devices 202 and 204 receive individual control voltages from respective external power sources.

The phase shifter 206 may be an example representative of the phase shifters 132, and 134 described in conjunction with FIG. 1. The phase shifter 206 may be formed along a portion of the first bus waveguide 106 to adjust the phase of the light stream propagating via the first bus waveguide 106. In particular, the phase shifter 206 may be operated by applying a control voltage via an external power source (not shown) to induce a predetermined phase shift (e.g., $\pi/2$), hereinafter referred to as a bus-induced phase change. Due to the bus-induced phase change (Ø) of $\pi/2$ between the light streams propagating inside the bus waveguides 106, 108, the superlinear transmission region of the second MRR 104 is aligned with the center of the optical output signal of the optical device 100. The alignment of the superlinear transmission region of the second MRR 104 with the center of the optical output signal, cancels or minimizes the nonlinearity in the optical output signal, by significantly reducing the nonlinearity near the peaks.

In the coherent optical neural network 200, optical output may be obtained from each of the device output ports 128 of the respective optical devices 202 and 204. Improvement in the linearity and bit-precision of the optical devices in the coherent optical neural network 200 are described with the help of graphical representations of FIGS. 3A-3B, 4A-4B, and 5.

Figure 3A:
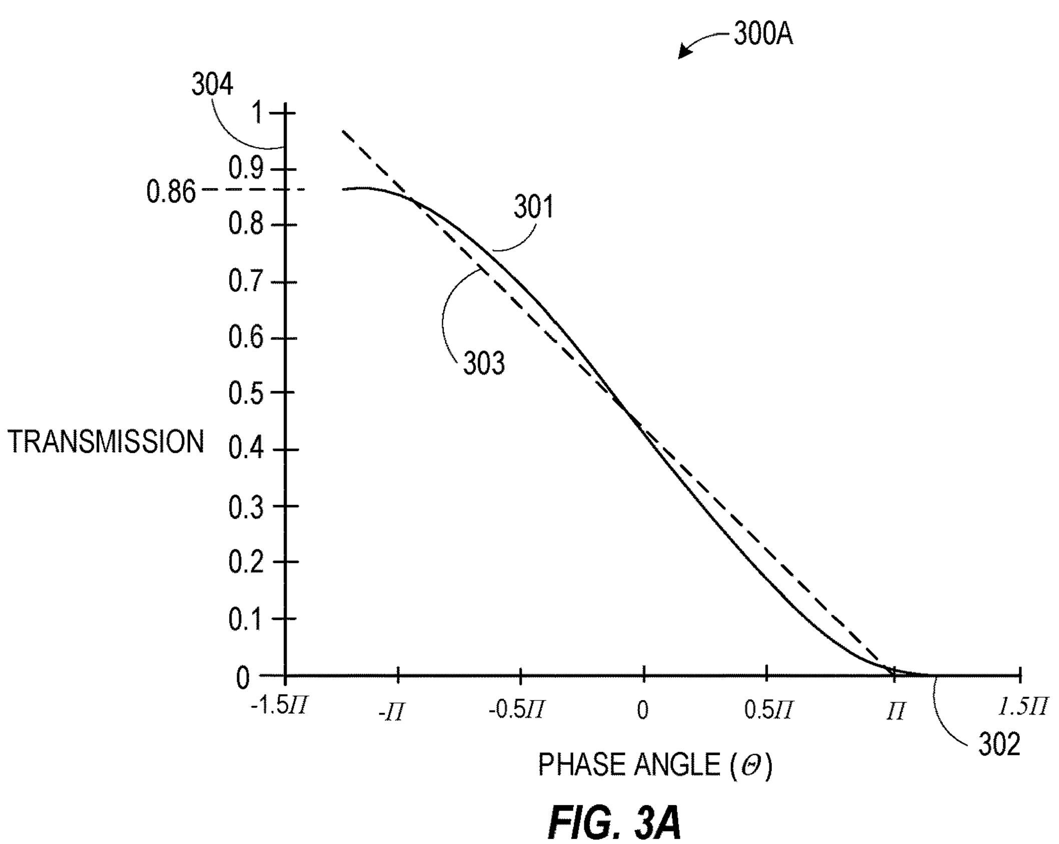
FIG. 3A depicts a graphical representation showing a calculated transmission of a conventional MZI.

Turning now to FIG. 3A, a graphical representation 300A comparing a transmission of a conventional MZI with a linear response is depicted. In the graphical representation 300A, an X-axis 302 represents a phase angle in radians, and a Y-axis 304 represents a transmission, alternatively referred to as normalized optical power, at an output port of the conventional MZI of 300 μm length. The transmission or the normalized optical power may be determined by dividing a measured or calculated optical power by a maximum optical power. Accordingly, on the Y-axis 304, a value of 1 (one) represents maximum optical power and a value of 0 (zero) represents non-detectable or no optical power.

To quantify the linearity of an optical output of the conventional MZI, a linear regression of the transmission via the conventional MZI is performed from zero (0) to full (1) transmission and the result is plotted in the graphical representation 300A in the form of a curve 301, hereinafter referred to as a normalized optical power or transmission 301. For the example graphical representation 300A, the conventional MZI is chosen to have an arm length of 300 μm and a loss of 20 dB/cm. The linear fitting for the conventional MRR from the transmission of 0.05 to 0.86 resulted in a standard error of about 0.0371 between the transmission 301 of the conventional MZI and the linear response 303.

Figure 3B:
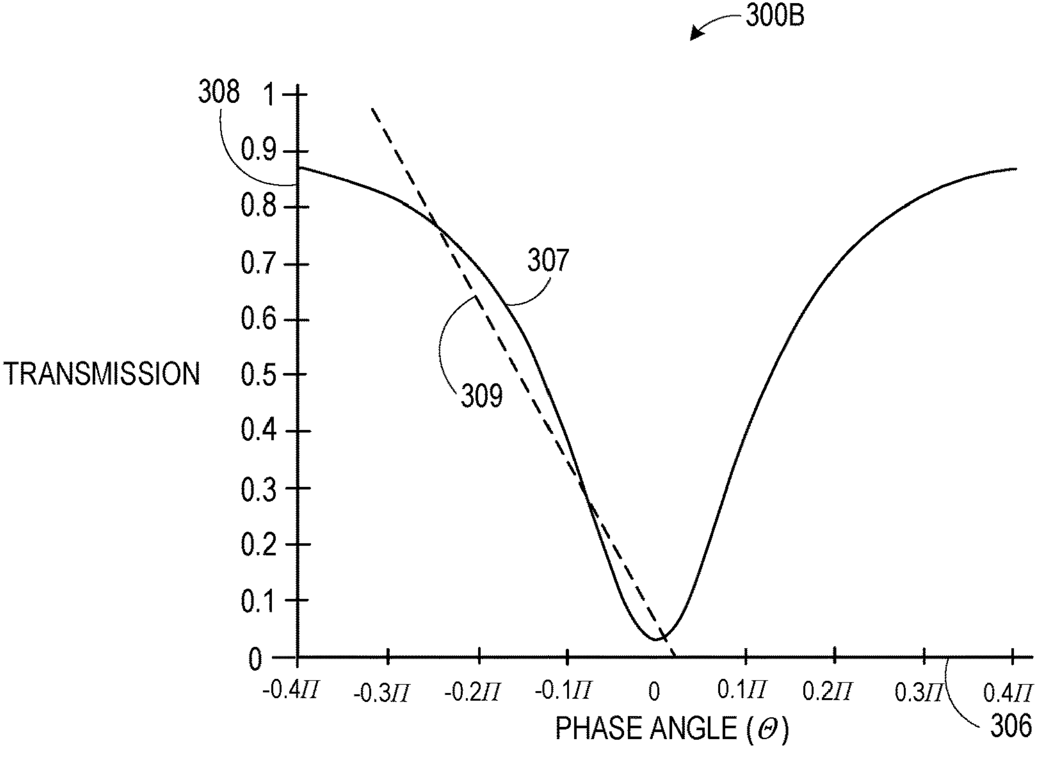
FIG. 3B depicts a graphical representation showing a calculated transmission of a conventional MRR.

Referring now to FIG. 3B, a graphical representation 300B comparing a transmission of a conventional MRR with a linear response is depicted. In the graphical representation 300B, an X-axis 306 represents a phase angle in radians, and a Y-axis 308 represents a transmission, alternatively referred to as normalized optical power, at an output port of the conventional MRR. The transmission or the normalized optical power may be determined by dividing a measured or calculated optical power by a maximum optical power. Accordingly, on the Y-axis 308, a value of 1 (one) represents maximum optical power and a value of 0 (zero) represents non-detectable or no optical power.

To quantify the linearity of an optical output of the conventional MRR, a linear regression of the transmission via the conventional MRR is performed from zero (0) to full (1) transmission and the result is plotted in the graphical representation 300B in the form of a curve 307, hereinafter referred to as a normalized optical power or transmission 307. For the example graphical representation 300B of FIG. 3B, the conventional MRR is chosen to have a field transmission coefficient of 0.98, a bus-ring coupling coefficient of 0.2, and a normalized field amplitude (e.g., actual field amplitude divided by the maximum amplitude) in the microring being 0.98. The linear fitting for the conventional MRR from the transmission of 0.05 to 0.8 resulted in a standard error of about 0.0573 between the transmission 307 of the conventional MRR and the linear response 309.

Figures 4A, 4B:
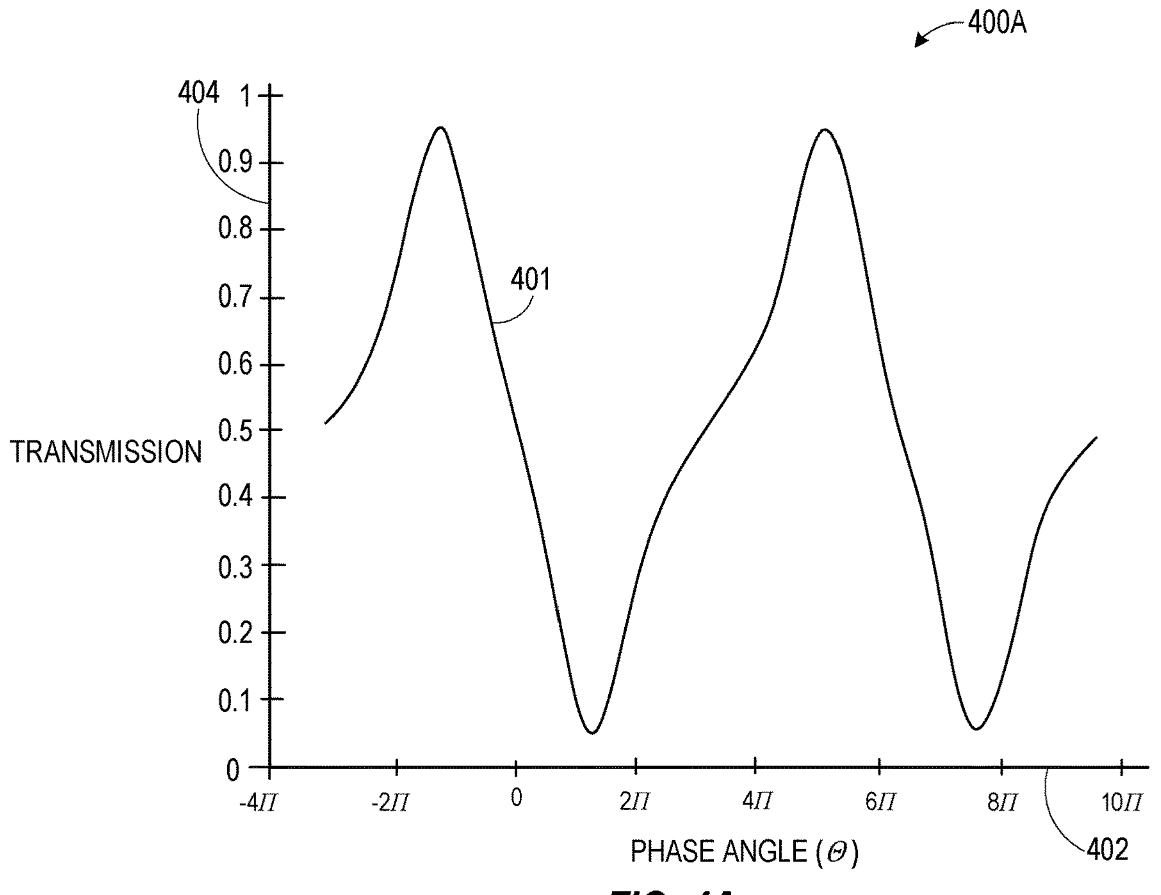
FIG. 4A depicts a graphical representation showing a calculated transmission of an example optical device in the coherent optical neural network of FIG. 2.
FIG. 4B depicts a graphical representation showing a deviation of the calculated transmission shown in FIG. 4A from a linear output.

Referring now to FIGS. 4A and 4B, an improvement in linearity of a proposed example optical device in a coherent optical neural network implementation is described with help of graphical representations 400A and 400B. In particular, the graphical representation 400A depicts a calculated optical transmission 401 of the example optical device 202 implemented in the coherent optical neural network 200 of FIG. 2. Further, the graphical representation 400B depicts a deviation of the calculated optical transmission 401 from a linear output. For ease of illustration hereinafter, FIGS. 4A-4B will be referenced concurrently. In the graphical representations 400A and 400B, an X-axis 402 represents a phase angle in radians, and a Y-axis 404 represents transmission values. On the Y-axis 404, a value of 1 (one) represents maximum optical power and a value of 0 (zero) represents non-detectable or no optical power. It is to be noted that, in the graphical representation 400B, the X-axis 402 shows finer values compared to the graphical representation 400A.

Output electric field ($E_{thru}$) and optical transmission ($O_t$) at the device output port 128 of the optical device 202 in the coherent optical neural network 200 may be determined using Equation (1) and Equation (2), respectively.

$$E_{thru} = \frac{\sqrt{2}}{2}\frac{a^2t_2e^{2j\theta} - at_1e^{j\theta} - at_1t_0t_2e^{j\theta} + t_0}{1 - at_1t_2e^{j\theta} - at_1t_0e^{j\theta} + a^2t_2t_0e^{2j\theta}}E_1 + \frac{\sqrt{2}}{2}\frac{-jak_1k_0k_2e^{j\theta}}{1 - at_1t_2e^{j\theta} - at_1t_0e^{j\theta} + a^2t_2t_0e^{2j\theta}}E_1e^{-j\phi} \quad \text{Equation (1)}$$

$$O_t = \frac{|E_{thru}|^2}{O_{MAX}} \quad \text{Equation (2)}$$

In Equations (1) and Equations (2)—

- $E_{thru}$ represents an electrical field at the through port 128,
- $E_1$ represents an electrical field at the coupler input port 112,
- a represents field amplitude in the microring, $|a|^2$ is the power in the microring,
- $k_0$ represents a field coupling coefficient of the bus-ring coupler 105,
- $k_1$ represents a field coupling coefficient of the ring-ring coupler 109,
- $k_2$ represents a field coupling coefficient of the bus-ring coupler 107,
- $t_0$ represents a field transmission coefficient of the bus-ring coupler 105,
- $t_1$ represents a field transmission coefficient of the ring-ring coupler 109,
- $t_2$ represents a field transmission coefficient of the bus-ring coupler 107,
- θ represents a phase accumulated per round in each of the MRRs 102, 104,
- Ø represents a phase difference between the first bus waveguide 106 and the second bus waveguide 108;
- $O_{MAX}$ represents a maximum optical power at the through port 128.

The calculated optical transmission 401 is a representation of the optical transmission ($O_t$) at the device output port 128 of the optical device 202 in the coherent optical neural network 200 plotted for several phase angles represented on the X-axis 402. Table-1 represented below provides example values of design parameters used to calculate the optical transmission (via Equations (1) and (2)).

TABLE 1

| Example values of design parameters for coherent optical neural network | |
|---|---|
| Parameter | Example value |
| a | 0.98 |
| $k_0$ | 45.6% |
| $k_1$ | 95.9% |
| $k_2$ | 97.3% |
| $t_0$ | 89% |
| $t_1$ | 28.3% |
| $t_2$ | 23% |
| ∅ | $\pi/2$ |

In particular, FIG. 4B represents an enlarged portion of a linear region of the transmission 401 in a period and a linear regression is applied to the transmission from 0.05 to 0.95. The available linear transmission ranges from 0.05 to 0.95 which is not from 0 to 1 due to the waveguide loss (which may be about 20 dB/cm). It should be noted that the transmission of a conventional 300 μm-long MZI is from 0 to 0.86 (see FIG. 3A), which is smaller than the coupled MRRs of the optical device 202. The standard error/standard deviation (σ1) between the transmission 401 of the optical device 202 and the linear response 403 is about 0.01, while the conventional MZI shows a standard error of about 0.0371, which is more than 3 times higher. Further, compared to the standard error of about 0.0573 (see FIG. 3B) in the case of a conventional MRR, the standard error between the transmission 401 of the optical device 202 and the linear response 403 is five times smaller. This indicates that the proposed example optical device 100 exhibits enhanced linearity compared to the conventional MZIs and MRRs, for example, when implemented in the coherent optical neural network.

Figure 5:
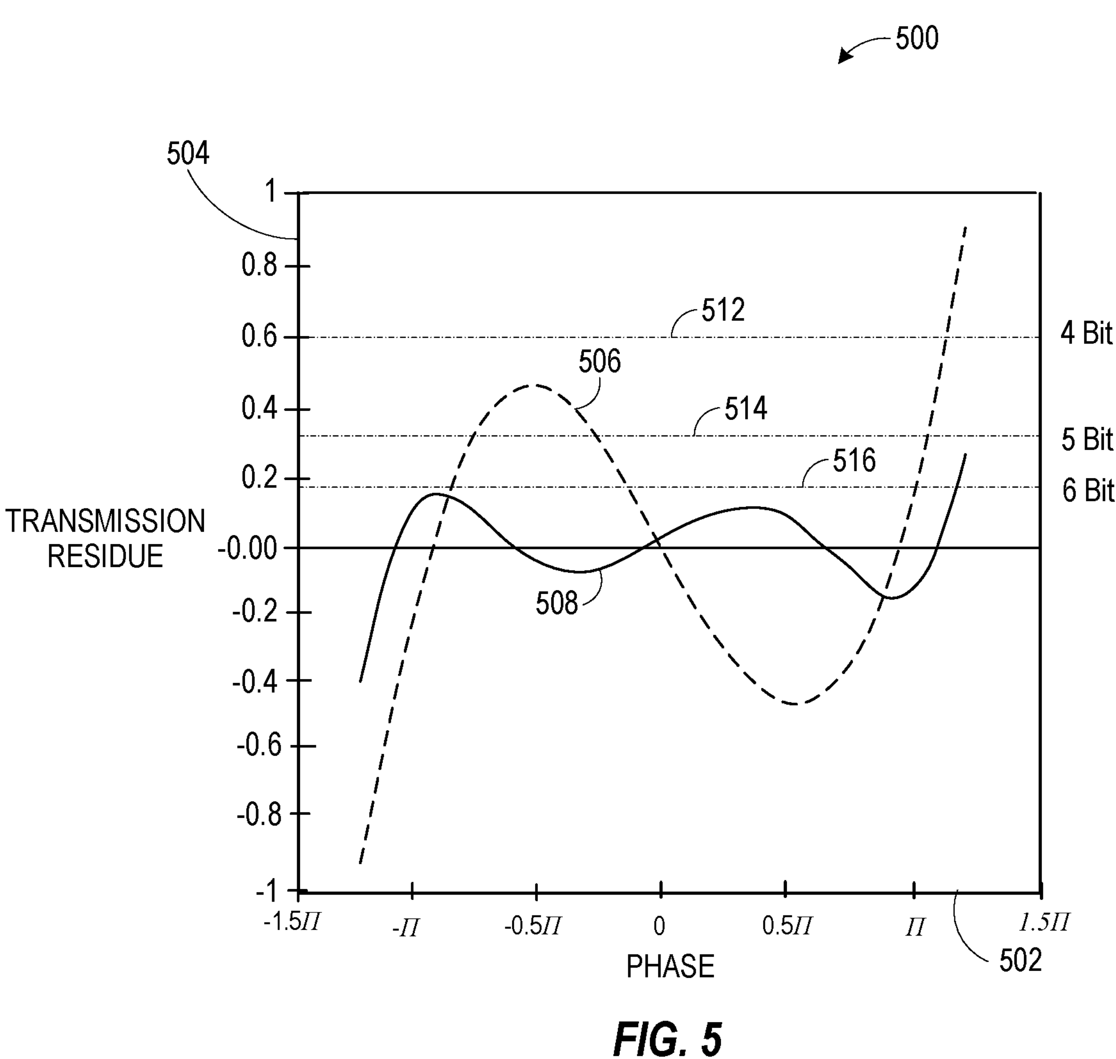
FIG. 5 depicts a graphical representation illustrating an improvement in the bit-precision of an example optical device compared to the bit-precisions of a conventional MZI in coherent optical neural network implementation.

Turning now to FIG. 5, a graphical representation 500 showing a comparison of bit-precisions between a conventional MZI and the optical device 202 in the coherent optical neural network 200 of FIG. 2 is depicted. In particular, an X-axis 502 represents a phase angle in radians and a Y-axis 504 represents transmission residuals of the linear regression. The term "transmission residual" as used herein may refer to a difference between an optical output and a linear response. In the graphical representation 500, a curve 506 (represented with a dashed line) depicts the transmission residuals for the conventional MZI which may be representative of a difference between the curves 301 and 303 (see FIG. 3A). Further, a curve 508 (represented with a solid line) depicts the transmission residuals for the optical device 202 which may be representative of a difference between the curves 401 and 403 (see FIG. 4B).

To compare the transmission residuals 506 and 508 with the least significant bit (LSB) values, a 4-bit LSB, 5-bit LSB, and 6-bit LSB lines are superimposed on the graphical representation 500. The 4-bit LSB, 5-bit LSB, and 6-bit LSB lines are respectively marked with reference numerals 512, 514, and 516. From the graphical representation 500, it is observed that the conventional MZI and the optical device 202, respectively provide 4-Bit and 6-Bit precision. Except in the marginal regions near "0" and "1", most of the residuals are less than the respective LSB levels. It means the optical device 202 may provide 2 bits more precision (4 times higher) compared to the conventional MZI.

Figure 6:
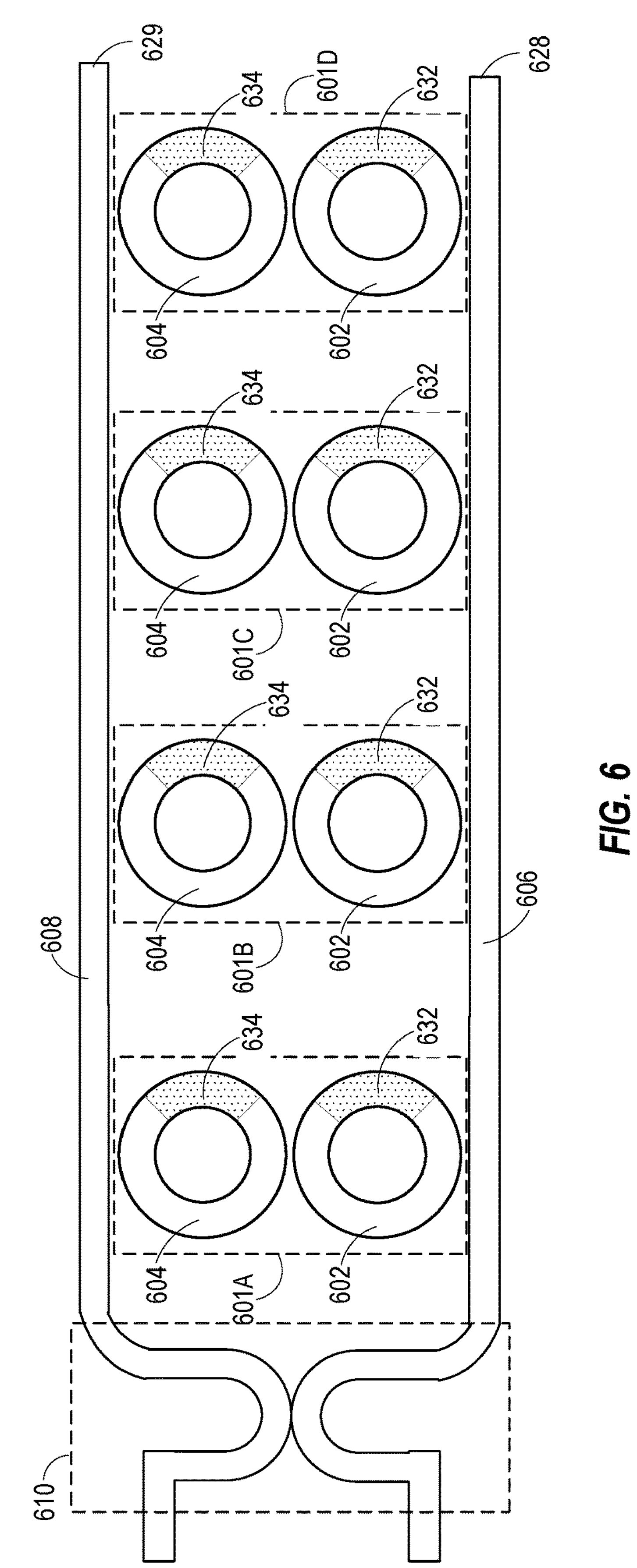
FIG. 6 depicts a block diagram of an example wavelength division multiplexing (WDM) optical neural network implemented using an example optical device having dual coupled microring resonators.

Turning now to FIG. 6, a block diagram of an example WDM optical neural network 600 formed using the example optical devices is depicted. The WDM optical neural network 600 may find applications in optical neural network systems capable of storing and processing data in optical form, or in any optical communication system.

The WDM optical neural network 600 of FIG. 6 is implemented using a plurality of pairs of MRRs 601A, 601B, 601C, 601D (hereinafter referred to as MRR pairs 601A-601D or MRR channels 301A-601D), common bus waveguides 606, 608, and a common optical distributor 610. The MRR pairs 601A-601D are formed between a common bus waveguide 606 and 608. In particular, the MRR pairs 601A-601D may be formed along the lengths of the common bus waveguides 606, 608 and are spaced apart from each other. Although the WDM optical neural network 600 is shown to include four MRR pairs 601A, 601B, 601C, and 601D, the WDM optical neural network 600 is envisioned to include several such additional MRR pairs, without limiting the scope of the present disclosure. The WDM optical neural network 600 with four MRR pairs 601A-601D is also referred to as a four-channel WDM optical neural network.

Each of the MRR pairs 601A, 601B, 601C, and 601D may include two MRRs, for example, the MRR 602 and 604. The MRRs 602 and 604 are example representatives of the MRRs 102 and 104 of FIG. 1. Further, the common bus waveguides 606 and 608 are example representatives of the bus waveguides 106 and 108. Each of the MRRs 602 and 604 is optically coupled to each other and with the common bus waveguides 606 and 608 in a similar fashion, as described in conjunction with the MRRs 102, 104, and the bus waveguides 106, 108 of FIG. 1.

Further, the common optical distributor 610, which is an example representative of the optical distributor 110, optically coupled to the common bus waveguides 606, 608 to distribute optical power to the common bus waveguides 606, 608. In particular, the common optical distributor 610 receives an input light stream and generates a first light stream and a second light stream from the input light stream. The common optical distributor 610 feeds the first light stream to the common bus waveguide 606 and the second light stream to the common bus waveguide 608.

Further, each of the MRR pairs 601A-601C includes phase shifters 632 and 634 formed along the MRRs 602 and 604, respectively. The phase shifters 632 and 634 are example representatives of the phase shifters 132 and 134 and are operated by applying control voltages via external power sources (not shown) to introduce ring-induced phase changes in order to finetune the alignment of the superlinear transmission region of the MRR 604 with the resonance of the MRR 602, thereby improving the linearity of the first optical output signal and the second optical output signal. The optical output of the WDM optical neural network 600 may be obtained at any of output ports 628 and 629.

Figure 7A:
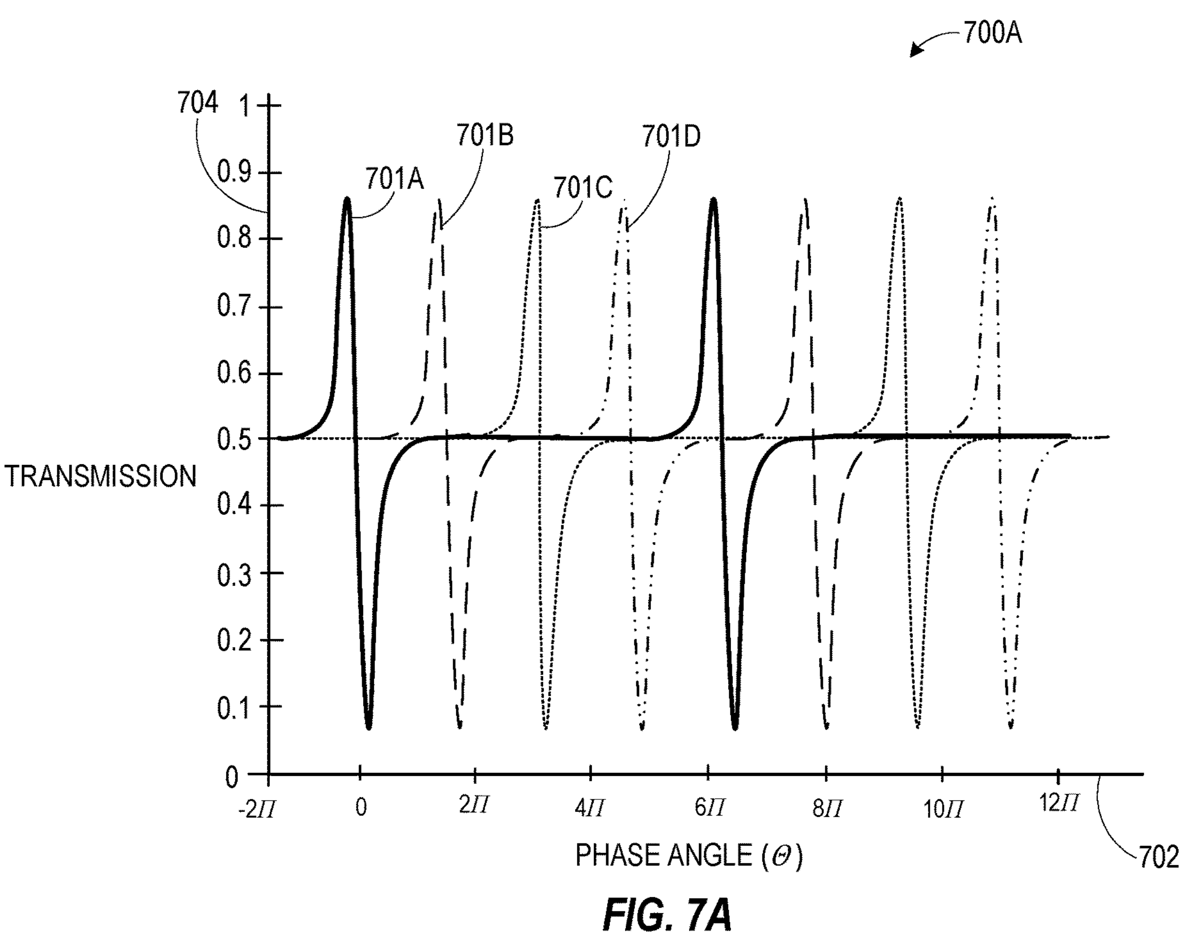
FIG. 7A depicts a graphical representation showing a calculated transmission of an example optical device in the WDM optical neural network of FIG. 6.
Figure 7B:
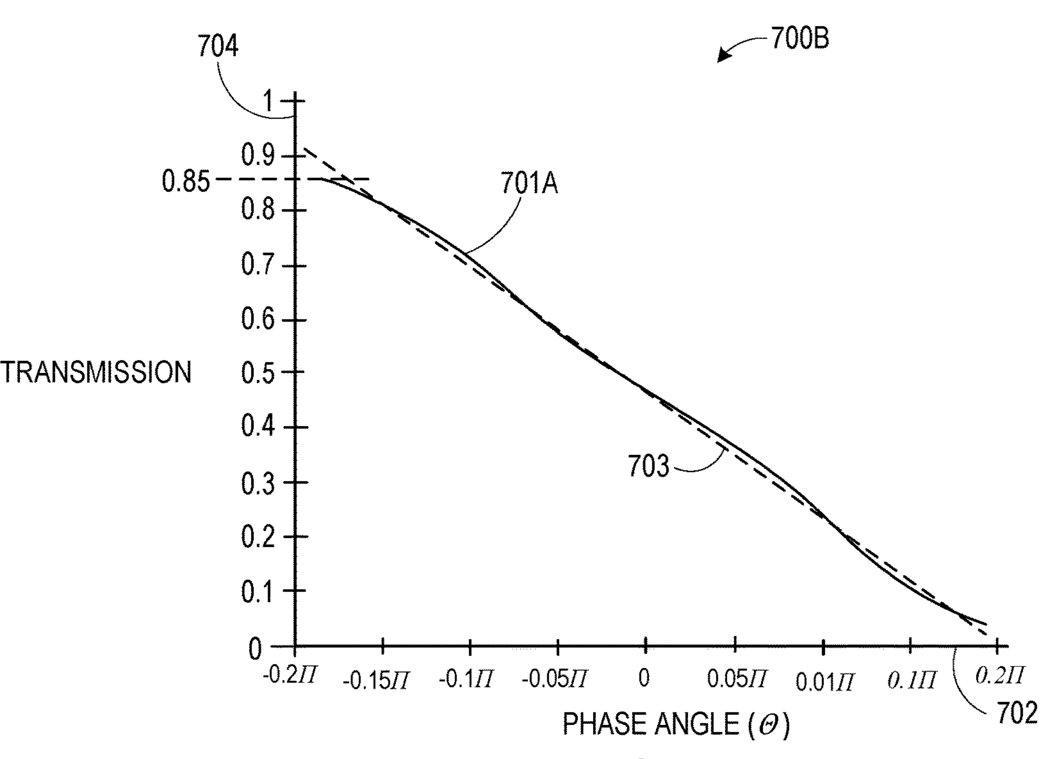
FIG. 7B depicts a graphical representation showing a deviation of the calculated transmission shown in FIG. 7A from a linear output.

FIGS. 7A and 7B depict graphical representations 700A and 700B showing an improvement in linearity of the proposed example implementation of coupled MRRs in the WDM optical neural network 600. In particular, the graphical representation 700A depicts a calculated optical transmission 701A, 701B, 701C, and 701D (e.g., using Equation (1) and Equation (2)) for the MRR pairs 601A, 601B, 601C, and 601D, respectively, in the WDM optical neural network 600 of FIG. 6. Further, the graphical representation 700B depicts a deviation of the calculated optical transmission 701A from a linear output. For ease of illustration hereinafter, FIGS. 7A-7B will be referenced concurrently. In the graphical representations 700A and 700B, an X-axis 702 represents a phase angle in radians, and a Y-axis 704 represents a calculated normalized optical power or transmission at the device output port 628 of the WDM optical neural network 600. On the Y-axis 704, a value of 1 (one)

represents maximum optical power and a value of 0 (zero) represents non-detectable or no optical power.

For the purpose of illustration, the linearity of transmission 701A is analyzed. Other transmissions 701B-701D may as well have similar linearity. For example, the calculated optical transmission 701A is a representation of the optical transmission at the device output port 628 in the WDM optical neural network 600 for the transmission via the MRR pair 601A plotted for several phase angles represented on the X-axis 702. Table-1 represented below provides example values of design parameters used to calculate the optical transmission 701A (via Equations (1) and (2)).

TABLE 1

Example values of design parameters for coherent optical neural network

| Parameter | Example value |
|---|---|
| a | 0.98 |
| $k_0$ | 20% |
| $k_1$ | 21% |
| $k_2$ | 57.2% |
| $t_0$ | 98% |
| $t_1$ | 97.8% |
| $t_2$ | 82% |
| ∅ | 0 |

FIG. 7B represents an enlarged portion of a linear region of the curve and linear regression of the transmission from 0.05 to 0.85 is performed. Therefore, in the graphical representation 700B, the X-axis 702 shows finer values compared to the graphical representation 700A. The standard error/standard deviation (σ2) between the transmission 701A of the optical device 202 and the linear response 703 is determined to be about 0.01.

In contrast, as depicted in FIG. 3B, the conventional MRR shows poor linearity and has limited linear region which results from its Lorentzian response nature. The linear fitting for the conventional MRR from the transmission of 0.05 to 0.8 resulted in a standard error of about 0.0573, which is more than 5 times higher than coupled MRRs implemented in the WDM optical neural network 600. This indicates that the proposed example optical device 100 exhibits enhanced linearity compared to the conventional MZIs and MRRs, for example, when implemented in the coherent optical neural network.

Figure 8:
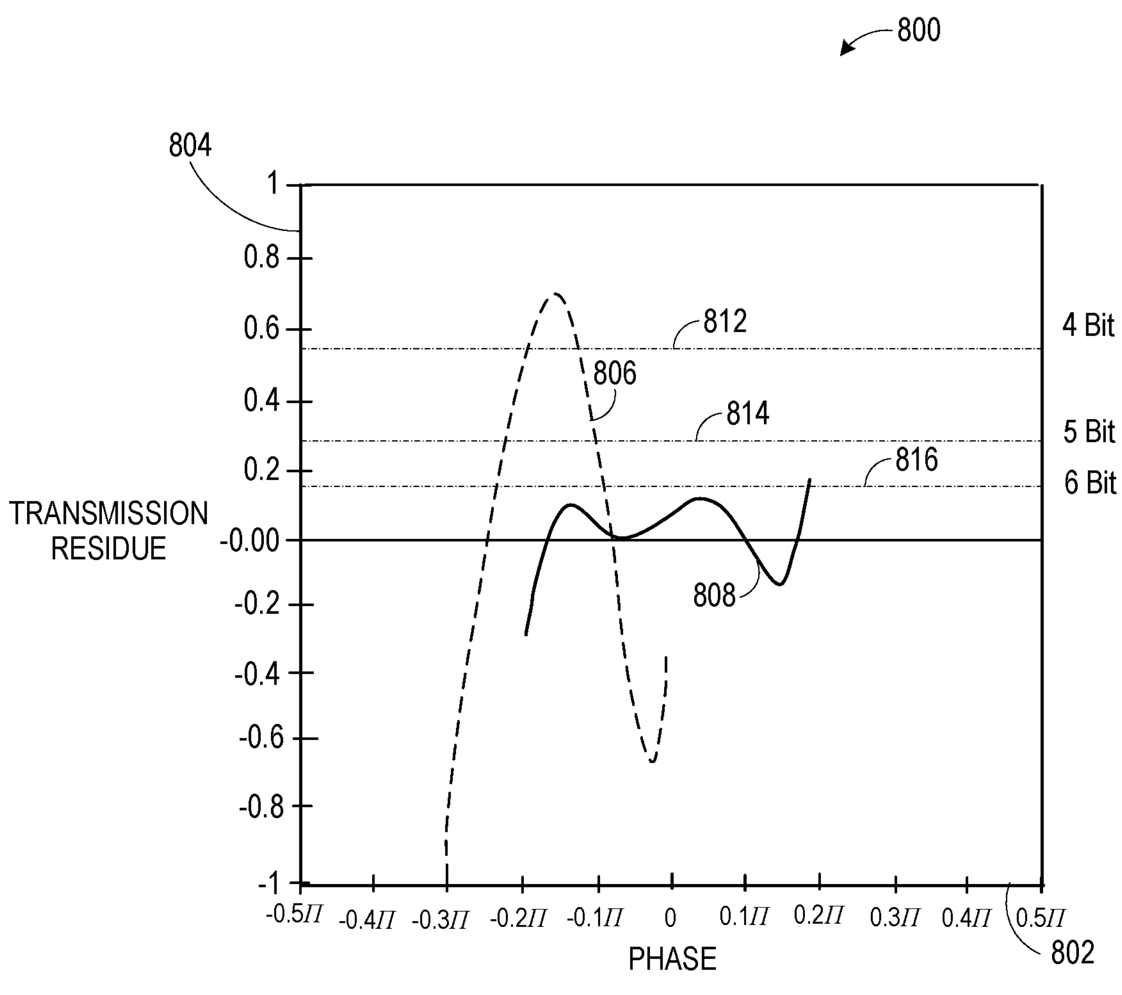
FIG. 8 depicts a graphical representation illustrating an improvement in the bit-precision of an example optical device compared to the bit-precisions of a conventional MRR in a WDM optical neural network implementation.

Turning now to FIG. 8, a graphical representation 800 showing a comparison of bit-precisions between the conventional MRR and the coupled MRRs implemented in the WDM optical neural network 600 of FIG. 6 is depicted. In particular, an X-axis 802 represents a phase angle in radians and a Y-axis 804 represents transmission residuals of the linear regression. In the graphical representation 800, a curve 806 (represented with a dashed line) depicts the transmission residuals for the conventional MRR which may be representative of a difference between the curves 307 and 309 (see FIG. 3B). Further, a curve 808 (represented with a solid line) depicts the transmission residuals indicating a difference between the curves 701A and 703 (see FIG. 7B).

To compare the transmission residuals 806 and 808 with the least significant bit (LSB) values, a 4-bit LSB, 5-bit LSB, and 6-bit LSB lines are superimposed on the graphical representation 800. The 4-bit LSB, 5-bit LSB, and 6-bit LSB lines are respectively marked with reference numerals 812, 814, and 816. From the graphical representation 800, it is observed that the conventional MRR and the coupled MRRs in the WDM optical neural network 600, respectively provide 3-Bit and 6-Bit precision. Except in the marginal regions near “0” and “1”, most of the residuals are less than the respective LSB levels. It means the use of MRR pairs 601A-601D in the WDM optical neural network 600 may provide 3 bits more precision (8 times higher) compared to the conventional MRR.

Figure 9:
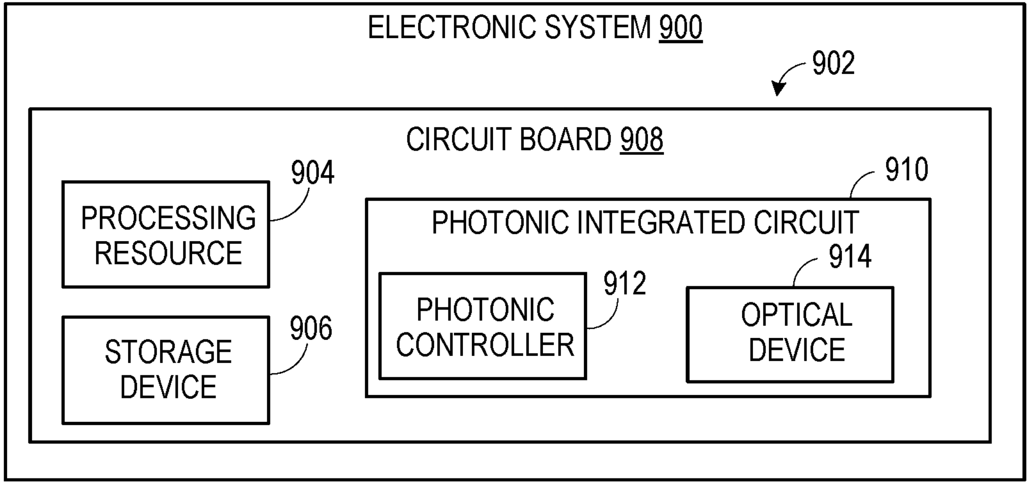
FIG. 9 depicts a block diagram of an example optical system.

Referring now to FIG. 9, a block diagram of an example electronic system 900 is presented. Examples of the electronic system 900 may include computers (stationary or portable), servers, storage systems, wireless access points, network switches, routers, docking stations, printers, or scanners. The electronic system 900 may be offered as a stand-alone product, a packaged solution, and can be utilized on a one-time full product/solution purchase or pay-per-use basis. The electronic system 900 may include one or more multi-chip modules, for example, a multi-chip module (MCM) 902 to process and/or store data. In some examples, the MCM 902 may include a processing resource 904 and a storage device 906 mounted on a circuit board 908. Additionally or alternatively to the processing resource 904 and a storage device 906, the MCM 902 may host a photonic integrated circuit 910 on the circuit board 908. In some other examples, one or more of the processing resource 904, the storage device 906, and the photonic integrated circuit 910 may be hosted on separate MCM (not shown). The circuit board 908 may be a printed circuit board (PCB) that includes several electrically conductive traces (not shown) to interconnect the processing resource 904, the storage device 906, and the photonic integrated circuit 910 with each other and/or with other components disposed on or outside of the PCB.

The processing resource 904 may be a physical device, for example, one or more central processing units (CPUs), one or more semiconductor-based microprocessors, microcontrollers, one or more graphics processing units (GPUs), application-specific integrated circuits (ASICs), a field-programmable gate arrays (FPGAs), other hardware devices, or combinations thereof, capable of retrieving and executing the instructions stored in the storage device 906. The processing resource 904 may fetch, decode, and execute the instructions stored in the storage device 906. As an alternative or in addition to executing the instructions, the processing resource 904 may include at least one integrated circuit (IC), control logic, electronic circuits, or combinations thereof that include a number of electronic components. The storage device 906 may be any electronic, magnetic, optical, or any other physical storage device that contains or stores instructions that are readable and executable by the processing resource 904. Thus, the storage device 906 may be, for example, Random Access Memory (RAM), non-volatile RAM (NVRAM), an Electrically Erasable Programmable Read-Only Memory (EEPROM), a storage device, an optical disc, and the like. In some embodiments, the storage device 906 may be a non-transitory storage device, where the term “non-transitory” does not encompass transitory propagating signals.

Further, in some examples, the photonic integrated circuit 910 may include a photonics controller 912 and one or more photonic devices such as the optical device 914. The optical device 914 may be an example representative of the optical device 100 of FIG. 1. The use of a different number of optical devices or the use of several different types of optical devices in the photonic integrated circuit 910 is also envisioned within the scope of the present disclosure. For example, the photonic integrated circuit 910 may also include other photonic devices such as but not limited to, optical converters, optical cables, waveguides, optical modulators (e.g., ring modulator), optical demodulators (e.g., ring demodulator), resonators, light sources (e.g., lasers), or the like. The photonic integrated circuit 910 may function as a neuromorphic computing unit capable of storing and/or processing data optically. Further, in some examples, the photonic integrated circuit 910 may include several of the optical device 914 arranged to form an optical neural network, for example, the coherent ONN 200 or the WDM ONN 600 shown in FIGS. 2 and 6, respectively. The photonics controller 912 may be implemented using an IC chip such as, but not limited to, an ASIC, an FPGA chip, a processor chip (e.g., CPU and/or GPU), a microcontroller, or a special-purpose processor. During the operation of the electronic system 900, the photonics controller 912 may apply signals (e.g., voltages to adjust phase angle changes via phase shifter(s)) to operate the optical device 914.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled to" as used herein, is defined as connected, whether directly without any intervening elements or indirectly with at least one intervening element, unless indicated otherwise. For example, two elements may be coupled to each other mechanically, electrically, optically, or communicatively linked through a communication channel, pathway, network, or system. Further, the term "and/or" as used herein refers to and encompasses any and all possible combinations of the associated listed items. It will also be understood that, although the terms first, second, third, fourth, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While certain implementations have been shown and described above, various changes in form and details may be made. For example, some features and/or functions that have been described in relation to one implementation and/or process may be related to other implementations. In other words, processes, features, components, and/or properties described in relation to one implementation may be useful in other implementations. Furthermore, it should be appreciated that the systems and methods described herein may include various combinations and/or sub-combinations of the components and/or features of the different implementations described. Moreover, method blocks described in various methods may be performed in series, parallel, or a combination thereof. Further, the method blocks may as well be performed in a different order than depicted in flow diagrams.

Further, in the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

What is claimed is:

1. An optical device comprising:

a first microring resonator (MRR);

a first bus waveguide optically coupled to the first MRR;

a second MRR optically coupled to the first MRR; a second bus waveguide optically coupled to the second MRR, wherein the first MRR and the second MRR are formed between the first bus waveguide and the second bus waveguide; and an optical distributor coupled to the first bus waveguide and the second bus waveguide and comprising two input ports and two output ports, wherein the optical distributor receives an input light through one of the two input ports, generates a first light stream and a second light stream from the input light, and feeds the first light stream to the first bus waveguide via a first output port of the two output ports and the second light stream to the second bus waveguide via a second output port of the two output ports, wherein the first MRR and the second MRR are designed to have equal diameters, thicknesses, and widths so that the first MRR and the second MRR have the same resonant wavelength, causing a superlinear transmission region of the second MRR to align with a resonant wavelength of the first MRR.

2. The optical device of claim 1, wherein the first MRR is formed between the first bus waveguide and the second MRR, and the second MRR is formed between the first MRR and the second bus waveguide.

3. The optical device of claim 1, wherein the first bus waveguide comprises a first output port and the second bus waveguide comprises a second output port, and wherein the first output port and the second output port are formed on a same side of the first MRR and the second MRR thereby reducing routing complexities in optical systems that use the optical device.

4. The optical device of claim 1, wherein the second MRR is over-coupled to the second bus waveguide, resulting in the superlinear transmission region comprising superlinear phase variations near a resonant wavelength of the second MRR.

5. The optical device of claim 1, further comprising a phase shifter formed along one or both of the first MRR or the second MRR to control a phase angle of light propagating inside the first MRR or the second MRR to align the superlinear transmission region of the second MRR with a resonant wavelength of the first MRR.

6. The optical device of claim 4, wherein optical coupling between the first MRR and the second MRR and an alignment of the superlinear transmission region of the second MRR with a resonant wavelength of the first MRR results increases linearity in an optical output signal of the optical device.

7. The optical device of claim 6, wherein increase in the linearity of the optical output signal increases bit precision of the optical device.

8. A coherent optical neural network (ONN) system, comprising:

a first optical device; and a second optical device optically coupled to the first optical device, wherein each of the first optical device and the second optical device comprises:

a first microring resonator (MRR);

a first bus waveguide optically coupled to the first MRR and comprising a first output port;

a second MRR optically coupled to the first MRR;

a second bus waveguide optically coupled to the second MRR and comprising a second output port, wherein the first MRR and the second MRR are formed between the first bus waveguide and the second bus waveguide; and an optical distributor coupled to the first bus waveguide and the second bus waveguide and comprising two input ports and two output ports, wherein the optical distributor receives an input light through one of the two input ports, generates a first light stream and a second light stream from the input light, and feeds the first light stream to the first bus waveguide via a first output port of the two output ports and the second light stream to the second bus waveguide via a second output port of the two output ports, wherein an input port of the two input ports of the optical distributor of second optical device is connected to one of the first output port and the second output port of a first optical device to receive an optical output signal of the first optical device;

wherein the first MRR and the second MRR are designed to have equal diameters, thicknesses, and widths so that the first MRR and the second MRR have the same resonant wavelength, causing a superlinear transmission region of the second MRR to align with a resonant wavelength of the first MRR.

9. The coherent ONN of claim 8, wherein the first output port and the second output port are formed on a same side of the first MRR and the second MRR thereby reducing routing complexities.

10. The coherent ONN of claim 8, wherein the second MRR is over-coupled to the second bus waveguide resulting in a superlinear transmission region comprising superlinear phase variations near a resonant wavelength of the second MRR.

11. The coherent ONN of claim 10, further comprising a first phase shifter formed along one or both of the first bus waveguide or the second bus waveguide to induce a predetermined phase shift in a light propagating via the first bus waveguide and the second bus waveguide causing the superlinear transmission region of the second MRR to align with superlinear transmission region of the first MRR thereby improving linearity of the optical output signal.

12. The coherent ONN of claim 8, further comprising:

a second phase shifter formed along the first MRR to control a phase angle of light propagating inside the first MRR; and a third phase shifter formed along the second MRR to control a phase angle of light propagating inside the second MRR.

13. A wavelength division multiplexing (WDM) optical neural network (ONN) system, comprising:

a first bus waveguide;

a second bus waveguide; and an optical distributor coupled to the first bus waveguide and the second bus waveguide and comprising two input ports and two output ports, wherein the optical distributor receives an input light through one of the two input ports, generates a first light stream and a second light stream from the input light, and feeds the first light stream to the first bus waveguide via a first output port of the two output ports and the second light stream to the second bus waveguide via a second output port of the two output ports, a plurality of pairs of microring resonators (MRRs) formed between the first bus waveguide and the second bus waveguide along a length of the first bus waveguide and the second bus waveguide, wherein each of the plurality of pairs of MRRs comprises:

a first microring resonator (MRR) optically coupled to the first bus waveguide; and a second MRR optically coupled to the second bus waveguide and the first MRR, wherein the first MRR is formed between the first bus waveguide and the second MRR, and the second MRR is formed between the first MRR and the second bus waveguide;

wherein the first MRR and the second MRR are designed to have equal diameters, thicknesses, and widths so that the first MRR and the second MRR have the same resonant wavelength, causing a superlinear transmission region of the second MRR to align with a resonant wavelength of the first MRR.

14. The WDM ONN of claim 13, wherein the second MRR is over-coupled to the second bus waveguide resulting in a superlinear transmission region comprising superlinear phase variations near a resonant wavelength of the second MRR.

15. The WDM ONN of claim 13, further comprising a phase shifter formed along one or both of the first MRR or second MRR to control a phase angle of light propagating inside the first MRR or the second MRR to align a superlinear transmission region of the second MRR with a resonant wavelength of the first MRR thereby improving linearity of an optical output signal of the WDM ONN.

* * * * *